US011610268B1

(12) United States Patent
Hayward et al.

(10) Patent No.: US 11,610,268 B1
(45) Date of Patent: Mar. 21, 2023

(54) SYSTEMS AND METHODS FOR PROCESSING TRIP-BASED INSURANCE POLICIES

(71) Applicant: STATE FARM MUTUAL AUTOMOBILE INSURANCE COMPANY, Bloomington, IL (US)

(72) Inventors: Gregory Hayward, Bloomington, IL (US); Scott T. Christensen, Salem, OR (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 17/023,253

(22) Filed: Sep. 16, 2020

Related U.S. Application Data

(63) Continuation of application No. 14/528,424, filed on Oct. 30, 2014, now Pat. No. 10,803,526.

(51) Int. Cl.
*G06Q 40/00* (2012.01)
*G06Q 40/08* (2012.01)
*G06Q 30/0272* (2023.01)
*G06Q 20/28* (2012.01)

(52) U.S. Cl.
CPC ............. *G06Q 40/08* (2013.01); *G06Q 20/28* (2013.01); *G06Q 30/0272* (2013.01)

(58) Field of Classification Search
CPC ............................... G06Q 40/08; G06Q 40/02
See application file for complete search history.

(56) References Cited

U.S. PATENT DOCUMENTS

| 6,285,931 | B1* | 9/2001 | Hattori ................. G07C 5/008 701/29.1 |
| 7,812,712 | B2 | 10/2010 | White et al. |
| 7,865,378 | B2 | 1/2011 | Gay |
| 7,870,010 | B2 | 1/2011 | Joao |
| 8,027,853 | B1 | 9/2011 | Kazenas |
| 8,423,239 | B2 | 4/2013 | Blumer et al. |
| 9,311,271 | B2 | 4/2016 | Wright |

(Continued)

OTHER PUBLICATIONS

Litman, Todd (Distance-Based Vehicle Insurance Feasibility, Costs and Benefits Comprehensive Technical Report, Victoria Transport Policy Institute, https://www.vtpi.org/dbvi_com.pdf, Jun. 8, 11) (Year: 2011).*

*Primary Examiner* — Mike Anderson
*Assistant Examiner* — Mark H Gaw
(74) *Attorney, Agent, or Firm* — Marshall, Gerstein & Borun LLP

(57) ABSTRACT

Methods and systems for processing trip-based insurance policies for vehicles. According to aspects, a trip-based insurance policy of a vehicle specifies an amount of trip units for insured vehicle travel and has an associated policy term. In certain cases, a customer may exhaust trip units before an expiration of the policy term. The methods and systems therefore enable the purchase of additional trip units so that the customer remains insured. In other cases, upon expiration of the policy term, an insurance provider may calculate an amount of unused trip units. The insurance provider may determine one or more types of credit that are based on the amount of unused trip units. The insurance provider may also apply the one or more types of credit to an account of the customer.

20 Claims, 8 Drawing Sheets

(56) References Cited

U.S. PATENT DOCUMENTS

| | | |
|---|---|---|
| 9,633,487 B2 | 4/2017 | Wright |
| 10,192,369 B2 | 1/2019 | Wright |
| 10,198,879 B2 | 2/2019 | Wright |
| 2002/0111725 A1 | 8/2002 | Burge |
| 2002/0194069 A1* | 12/2002 | Thakur .............. G06Q 30/0216 705/14.18 |
| 2004/0019539 A1* | 1/2004 | Raman .................... H04W 4/24 705/29 |
| 2004/0139034 A1* | 7/2004 | Farmer .............. G06Q 30/0283 705/400 |
| 2004/0153362 A1* | 8/2004 | Bauer .................... G07C 5/008 705/1.1 |
| 2005/0267784 A1 | 12/2005 | Slen et al. |
| 2006/0079280 A1 | 4/2006 | LaPerch |
| 2007/0282638 A1* | 12/2007 | Surovy .................. G06Q 40/08 705/4 |
| 2007/0299700 A1* | 12/2007 | Gay ....................... G06Q 40/08 705/4 |
| 2013/0317693 A1 | 11/2013 | Jefferies et al. |

\* cited by examiner

NOTICE

THE TERM FOR YOUR TRIP-BASED INSURANCE POLICY HAS LAPSED!

GREAT NEWS! YOU HAVE [2] UNUSED TRIPS REMAINING FROM YOUR POLICY.

WOULD YOU LIKE TO REVIEW YOUR CREDIT OPTIONS FOR THESE UNUSED TRIPS?

NO — 461
YES — 462

CREDIT OPTIONS FOR YOUR [2] UNUSED TRIPS:

○ ROLLOVER 2 TRIPS INTO RENEWAL POLICY
○ 10% OFF RENEWAL POLICY
⦿ $25.00 CASH DEPOSITED TO BANK ACCOUNT — 465

CANCEL — 466
SUBMIT — 467

SUCCESS!

$25.00 HAS BEEN DEPOSITED INTO YOUR BANK ACCOUNT!

WOULD YOU LIKE TO REVIEW OPTIONS FOR A RENEWAL POLICY?

NO THANKS — 469
YES — 470

*FIG. 4C*

SYSTEMS AND METHODS FOR PROCESSING TRIP-BASED INSURANCE POLICIES

CROSS-REFERENCE TO RELATED APPLICATIONS

The application is a continuation of U.S. patent application Ser. No. 14/528,424, filed Oct. 30, 2014, and incorporated by reference herein in its entirety.

FIELD OF THE DISCLOSURE

The present disclosure generally relates to vehicle insurance policies and, more particularly, to systems and methods for processing refunds and facilitating purchases associated with trip-based insurance policies.

BACKGROUND

Vehicle or automobile insurance exists to provide financial protection against physical damage and/or bodily injury resulting from traffic accidents and against liability that could arise therefrom. Typically, a customer purchases a vehicle insurance policy for a policy rate having a specified term. In exchange for payments from the insured customer, the insurer pays for damages to the insured which are caused by covered perils, acts, or events as specified by the language of the insurance policy. The payments from the insured are generally referred to as "premiums," and typically are paid on behalf of the insured over time at periodic intervals. An insurance policy may remain (or have a status or state of) "in-force" while premium payments are made during the term or length of coverage of the policy as indicated in the policy. An insurance policy may "lapse" (or have a status or state of "lapsed"), for example, when premium payments are not being paid or if the insured or the insurer cancels the policy.

An inefficiency exists in the current market for vehicle insurance policies. Typically, an insurance provider will offer vehicle insurance for a specific policy term, with the premium based on a risk profile of the customer (and in certain cases, an estimated amount of miles that the customer anticipates driving during the policy term). However, the premium is not based at all on the number of trips that a vehicle will undertake. In certain cases, the number of trips that the vehicle will undertake may be a more accurate gauge of the premium that a customer should pay or desires to pay.

Accordingly, there is an opportunity for systems and methods to process credits and facilitate purchases associated with trip-based vehicle insurance policies. In particular, there is an opportunity for systems and methods to process credits that are commensurate with any unused trip units associated with trip-based vehicle insurance policies, as well as facilitate the purchase of additional trip units in situations in which the policy is still in force but no original trip units remain.

SUMMARY

In an embodiment, a computer-implemented method of crediting customers having trip-based vehicle insurance policies is provided. The method includes facilitating, by a processor, a purchase transaction with a customer for a trip-based insurance policy associated with a vehicle, a coverage provided by the trip-based insurance policy (1) is based on an amount of trip units specified by the trip-based insurance policy, and (2) expires at a pre-determined time and, responsive to the pre-determined time expiring, receiving a current trip unit reading of the vehicle. The method further includes, based on the current trip unit reading, determining, by the processor, that the amount of trip units has not been reached, and applying a credit to an account of the customer.

In another embodiment, a computer-implemented method of processing insurance coverage is provided. The method includes facilitating, by one or more processors, a purchase transaction with a customer for a trip-based insurance policy associated with a vehicle, a coverage provided by the insurance policy (1) is based on an amount of trip units specified by the trip-based insurance policy, and (2) expires at the end of a policy term, and, before the policy term expires, receiving a current trip unit reading of the vehicle. The method further includes, based on the current trip unit reading, determining, by the one or more processors, that the amount of trip units has been exhausted or is close to being exhausted, and facilitating, by the one or more processors, an additional purchase transaction with the customer for an additional amount of trip units.

In a further embodiment, a system for processing trip-based vehicle insurance policies is provided. The system includes a communication module adapted to communicate data, a memory adapted to store non-transitory computer executable instructions, and a processor adapted to interface with the communication module. The processor is configured to execute the non-transitory computer executable instructions to cause the processor to facilitate a purchase transaction with a customer for a trip-based insurance policy associated with a vehicle, a coverage provided by the trip-based insurance policy (1) is based on an amount of trip units specified by the trip-based insurance policy, and (2) expires at a pre-determined time. For example, the policy may provide for fifty (50) trips units that expire on December 31. Before the pre-determined time expires, the processor is configured to detect that the amount of trip units has been exhausted or is close to being exhausted, notify the customer that the amount of trip units has been exhausted or is close to being exhausted, and facilitate an additional purchase transaction with the customer for an additional amount of trip units. Responsive to the pre-determined time expiring, the processor is configured to receive, via the communication module, a current trip unit reading of the vehicle. Based on the current trip unit reading, the processor is configured to determine that the additional amount of trip units has not been reached, and apply a credit to an account of the customer.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 4A-4C depict example interfaces associated with reviewing and selecting credits associated with trip-based vehicle insurance policies in accordance with some embodiments.

DETAILED DESCRIPTION

Figure 1:
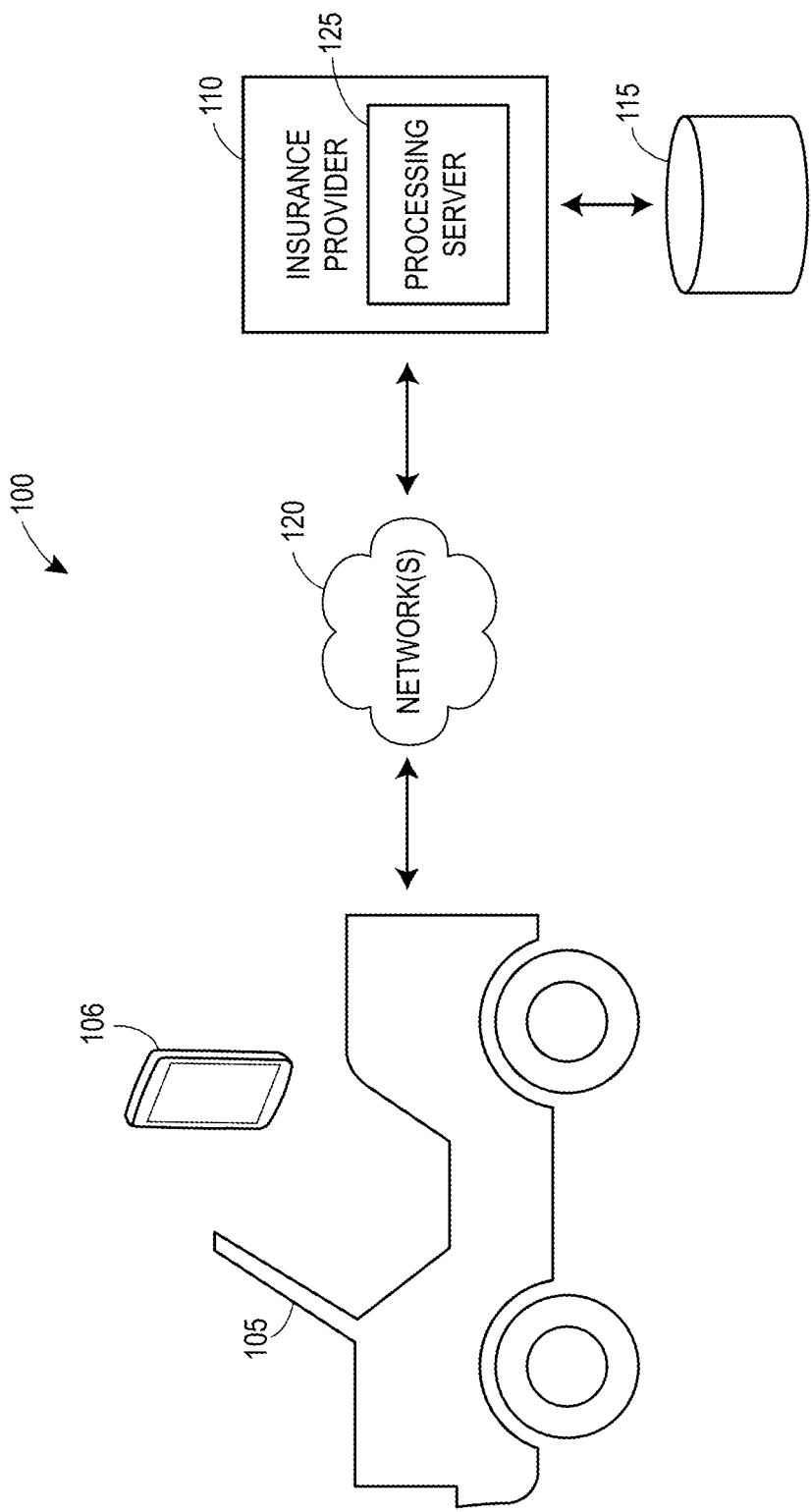
FIG. 1 depicts an example environment including components and entities associated with processing trip-based vehicle insurance policies in accordance with some embodiments.

The novel systems and methods disclosed herein relate generally to processing vehicle insurance policies. In particular, the systems and methods relate to crediting customers having trip-based insurance policies through an insurance provider, as well as enabling customers to purchase additional trip units associated with existing trip-based insurance policies. According to certain aspects, a trip-based insurance policy for a vehicle is defined by a certain amount of "trip units" and a policy term or expiration time. Each trip unit may correspond with one vehicle trip, in some embodiments. Accordingly, the vehicle and a customer associated with the vehicle (e.g., the vehicle owner or operator) may be covered by the insurance policy while the policy term is in force and as long as the vehicle does not operate in excess of the amount of trip units.

Although some customers will meet the trip unit limit during the policy term, there will also be instances in which customers have a balance or remainder of unused trip units upon expiration of the policy term. According to the present embodiments, the systems and methods are configured to process credits or refunds according to the unused trip units. Upon expiration of a policy term for a particular trip-based insurance policy, the insurance provider may query the vehicle or customer for a current trip unit reading and compare the current trip unit reading to an amount of trip units originally specified by the trip-based insurance policy. If there are unused trip units, then the customer may be due some form of credit or refund. According to aspects, the credit may be in the form of "rollover" trip units, monetary credit or cash, credit with the insurance provider, various discounts or offers, and/or other types of credit.

There may be additional situations in which a customer having a trip-based insurance policy will run out of trip units before the end of the policy term. In these situations, any additional operation of the vehicle will not be covered under the original trip-based insurance policy. According to the present embodiments, the systems and methods are further configured to enable customers to purchase additional trip units before the expiration of the policy term so that the customer is continuously covered by the insurance policy. In particular, the customer, vehicle, or insurance provider may monitor the amount of original trip units during the policy term. If at some point there are few or no remaining trip units, the insurance provider may offer the customer additional trip units, which the customer can select to purchase.

The systems and methods therefore offer a benefit to customers by rewarding credit that corresponds to what is effectively unused insurance coverage. Accordingly, customers may be incentivized to purchase trip-based vehicle insurance, especially in situations in which the customers may otherwise operate a vehicle without insurance. The systems and methods further offer a benefit to customers by enabling customers to purchase what is effectively additional trip-based vehicle insurance in situations in which the customers may not be otherwise covered. Therefore, the customers may continuously have vehicle insurance when the customers may not have otherwise foreseen using all original trip units during a policy term. Further, insurance providers may be able to attract more customers and/or process more insurance policies.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

FIG. 1 depicts an example environment 100 associated with processing trip-based vehicle insurance policies. Although FIG. 1 depicts certain entities, components, and devices, it should be appreciated that additional or alternate entities and components are envisioned.

As illustrated in FIG. 1, the environment 100 includes a vehicle 105 that may be any type of car, automobile, truck, motorcycle, fleet of vehicles, marine vessel, or other vehicle capable of being driven or operated by a driver or operator. The vehicle 105 has an electronic device 106 associated therewith. In some cases, the electronic device 106 may be installed as an on-board dash of the vehicle 105, such as part of an original equipment manufacturer (OEM) installation on the vehicle 105. In other cases, the electronic device 106 may belong to a driver or operator of the vehicle 105 (generally, a "vehicle operator"). For example, the electronic device 106 may be a smartphone of the vehicle operator. It should be appreciated that other types of electronic devices are envisioned, such as notebook computers, tablets, GPS devices, and/or the like.

The electronic device 106 can be configured to communicate with an insurance provider 110 via a network 120. The network 120 can facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, and/or others). The insurance provider 110 can be any individual, group of individuals, company, corporation, or other type of entity that can offer and issue insurance policies for customers, such as a vehicle insurance policy for the vehicle 105. According to embodiments, the insurance provider 110 can include one or more processing server(s) 125 configured to facilitate the functionalities as discussed herein. Although FIG. 1 depicts the processing server 125 as a part of the insurance provider 110, it should be appreciated that the processing server 125 can be separate from (and connected to or accessible by) the insurance provider 110.

According to embodiments, the insurance provider 110 may issue, to the vehicle operator, a trip-based insurance policy associated with the vehicle 105. In particular, the trip-based insurance policy may provide coverage for the vehicle operator and/or the vehicle 105. Specifically, the trip-based insurance policy provides coverage for a certain amount of trips that may be undertaken by the vehicle 105. Generally, a "vehicle trip" or simply "trip" (having an associated "trip unit") may be defined as a single outing or operation of the vehicle 105 along a route from a departure location to a terminal location. A trip may include one or more stops along the route of the vehicle between the departure location and the terminal location. As generally used herein, a "stop" may be defined as any point along the route of the vehicle 105 during a vehicle trip where the vehicle trip is interrupted for a period of time, during which the vehicle's 105 progress between the departure location and the terminal location is halted, other than by the ordinary and momentary cessation of movement of the vehicle 105 in the usual course of operation or as required by control signals, by law, or to avoid collisions. For example, the vehicle 105 may pause at a traffic light, stop sign, toll booth, or along a road to yield way to an emergency vehicle without such pause being a "stop" as used herein. In various embodiments, stops of the vehicle 105 may be measured in a number of ways, including duration, engine shut-down, or location (e.g., exiting a road or entering a dock).

In some embodiments, each operation of the vehicle 105 along a route from a departure location to a terminal location may correspond to a single trip unit. In other embodiments, each trip unit may be limited by one or more additional metrics, such as time, duration, or stops. In a variety of embodiments, one or more of the following vehicle trip limitations may be included: a predetermined maximum distance traveled by the vehicle 105 in one vehicle trip; a predetermined maximum duration of vehicle operation within one vehicle trip; a predetermined maximum duration during which the engine of the vehicle 105 is running in one vehicle trip; a predetermined maximum number of times the engine of the vehicle 105 is started or shut off in one vehicle trip; a predetermined number of times the vehicle operator enter or exits the vehicle 105 in one vehicle trip; a predetermined number of times the vehicle 105 is near a geographic location; a predetermined maximum speed of the vehicle 105 during the vehicle trip; a predetermined maximum revolutions per minute of the engine of the vehicle 105 during the vehicle trip; a predetermined maximum lateral acceleration of the vehicle 105 during the vehicle trip; a predetermined maximum longitudinal acceleration of the vehicle 105 during the vehicle trip; or a predetermined maximum number of occupants within the vehicle 105 during the vehicle trip. Trip units may also be time-limited, such that a vehicle trip exceeding a predetermined time threshold (e.g., 2 hours, 24 hours, etc.) is recorded as using more than one trip unit. Further, a vehicle trip may incur the use of an additional trip unit if the vehicle 105 passes a location more than a predetermined number of times, such as where the vehicle 105 makes multiple deliveries from a central location in a number of separate segments but where the central location is not a departure location of a vehicle trip (e.g., deliveries from a pizzeria).

In some embodiments, the processing server 125 may use the vehicle trip limitations to adjust the number of trip units charged for a vehicle trip that exceeds the vehicle trip limitation threshold or thresholds. For example, a vehicle trip of 300 miles may incur a charge of two trip units where a trip unit specifies a vehicle trip limitation of 200 miles. Alternatively, fractional trip units may be used, such that only one and a half trip units are charged in the preceding example. In other embodiments, a surcharge or additional premium rate may apply to vehicle trips that exceed the thresholds of the vehicle trip limitations. For example, a vehicle insurance policy may provide for a cost per trip unit of $3.33 with a vehicle trip limitation of sixty (60) miles and an additional premium of $0.12 per mile beyond the vehicle trip limitation.

In some embodiments, a vehicle trip may incur the use of additional trip units or a monetary surcharge for unsafe vehicle operation, such as hard braking, excessive lateral or longitudinal acceleration, instances of RPM measurements above a threshold, vehicle swerving, measures of distraction or drowsiness, or other indications of unsafe vehicle operation based on telemetric or biometric measurements. For example, the vehicle trip may be analyzed upon completion, and a surcharge (e.g., 0.05 trip units, $0.07, etc.) may be added for each recorded instance of hard braking. Additionally, a surcharge may be added for vehicle trips occurring at hazardous times or during inclement weather conditions.

Additionally, or alternatively, in some embodiments, vehicle trips that fail to meet a predetermined minimum threshold for duration, distance, or other metrics may be covered without incurring the use of a trip unit. For example, the vehicle insurance policy may not be charged the use of one trip unit where a vehicle engine operates for less than a minute or where the vehicle moves less than twenty feet. This may reduce the number of false determinations of the occurrence of a vehicle trip, such as may occur where, for example, the vehicle 105 is started solely to operate a powered feature of the vehicle 105, such as opening or closing windows.

There may be various sensors in the vehicle to detect the initiation and termination of vehicle trips. For example, the sensors may include various door sensors, engine sensors, motion sensors, ignition sensors, or the like. It should be appreciated that other sensors are envisioned such as, for example, a system clock, a speedometer, a tachometer, an accelerometer, a gyroscope, a compass, and the like. The vehicle 105 and/or the electronic device 106 associated therewith may communicate with the various sensors to receive relevant sensor data. Accordingly, based on the sensor data, the vehicle 105 or the electronic device 106 associated therewith may detect, calculate, or otherwise process the initiation and termination of vehicle trips for the vehicle 105. Of course, the vehicle 105 and/or the electronic device 106 may calculate, store, or otherwise maintain a measure of a current number of trips taken (e.g., a "current trip unit reading") by the vehicle 105 within a certain time period (e.g., a policy term of the trip-based insurance policy).

Generally, when the vehicle operator purchases a trip-based insurance policy from the insurance provider 110, the current trip unit reading may be set to a default value of zero (0). Accordingly, the trip-based insurance policy has an "expiration trip value" that corresponds to the amount of "trip units" that the customer wishes to purchase. In embodiments as described herein, the trip units may correspond to a single outing or operation of the vehicle 105 along a route from a departure location to a terminal location. For example, a trip-based insurance policy may insure fifty (50) trip units. It should be appreciated that the amount of trip units as well as any limitations or restrictions for each trip unit may vary, depending on various factors such as what the customer desires and/or what the insurance provider offers.

The trip-based insurance policies may also specify an expiration date or time, or policy term, within which the vehicle operators may use their trip units (e.g., by driving their vehicles on trips). For example, if a trip-based insurance policy insures one hundred (100) trips and has a policy term of six (6) months, then the vehicle operator (and/or the vehicle 105, depending on the coverage) is insured for a total of one hundred (100) trips assuming that the vehicle operator makes the trips within the six (6) month policy term. In embodiments, the unused trip units expire or lapse upon expiration of the policy term. Therefore, absent a renewal or purchase of additional trip units, the vehicle operator and/or the vehicle 105 will not be insured past the policy term, even if there remain any unused trip units. For example, if a trip-based insurance policy is in force starting on January 1 and has a six (6) month policy term, the expiration date of the policy is June 30, whereby neither the vehicle operator nor the vehicle 105 is insured according to the policy beginning on July 1, even if there are unused trip units.

According to the present embodiments, the insurance provider 110 is configured to process refunds, credits, or the like (generally: "credits") for any trip units that are unused as of the end of a policy term for a trip-based insurance policy. The insurance provider 110 is configured to maintain accounts for the vehicle operators, whereby the accounts specify the terms of the trip-based insurance policies. The insurance provider 110 may also determine an appropriate amount of credits and apply the credits to the accounts.

In some cases, the credits may be in the form of "rollover" trip units. For example, if a trip-based insurance policy covers one thousand (1,000) trips and at the end of the policy term there are two hundred (200) unused trips, then these two hundred (200) unused trips may be deemed as rollover trips and the insurance provider 110 may credit these two hundred (200) trips to an account of the corresponding vehicle operator. In other cases, the credits may be in the form of a monetary credit (i.e., cash or cash equivalent), whereby any unused trip units may have an associated value that the insurance provider 110 can use to calculate the monetary credit owed to a vehicle operator. For example, if a vehicle operator has five (5) unused trips at the end of the policy term and each unused trip has a cash value of $2.00, then the insurance provider 110 can determine that the vehicle operator is owed $10.00 and can credit an account of the vehicle operator, such as by processing a "refund," issuing a check or other payment, adding to an account balance, or performing another refund. The credit may also be in other forms, such as a credit with the insurance provider 110, a discount on subsequent insurance products, or other types of credit.

Similarly, a vehicle operator may use up all of the allotted trip units before the expiration of the policy term. In this case, the vehicle operator (and/or the vehicle 105) may not be covered under an insurance policy if there are no remaining trip units, even if the insurance policy is still in force. Accordingly, the vehicle operator may want to purchase additional trip units or otherwise be presented with an option to purchase additional trip units. In embodiments, the insurance provider 110 (or the electronic device 106) can determine when there are no remaining trip units during a policy term. The insurance provider 110 can also generate a quote for an additional amount of trip units, and provide the quote to the vehicle operator. In embodiments, the additional amount of trip units may be based on the amount of used trip units and a time remaining in the policy term. The vehicle operator can review the quote, and select to purchase the additional amount of trip units or request a modified quote for a different amount of trip units. In some embodiments, the insurance provider 110 (or the electronic device) can automatically charge the vehicle operator (and/or automatically process a payment) for the additional trip units in response to determining that no original trip units remain.

The processing server 125 can be coupled to a database 115 configured to store data associated with vehicle insurance policies. Further, the database 115 may store account data associated with accounts of customers, whereby each customer account specifies the terms of the respective trip-based insurance policy. The processing server 125 may be configured to monitor expiration dates of the trip-based insurance policies, as well as (1) process appropriate refunds or credits according to any unused trip units and (2) process the purchase of additional trip units. In some embodiments, the processing server 125 may also facilitate the purchase of additional or renewal insurance policies for the customers.

Figure 2:
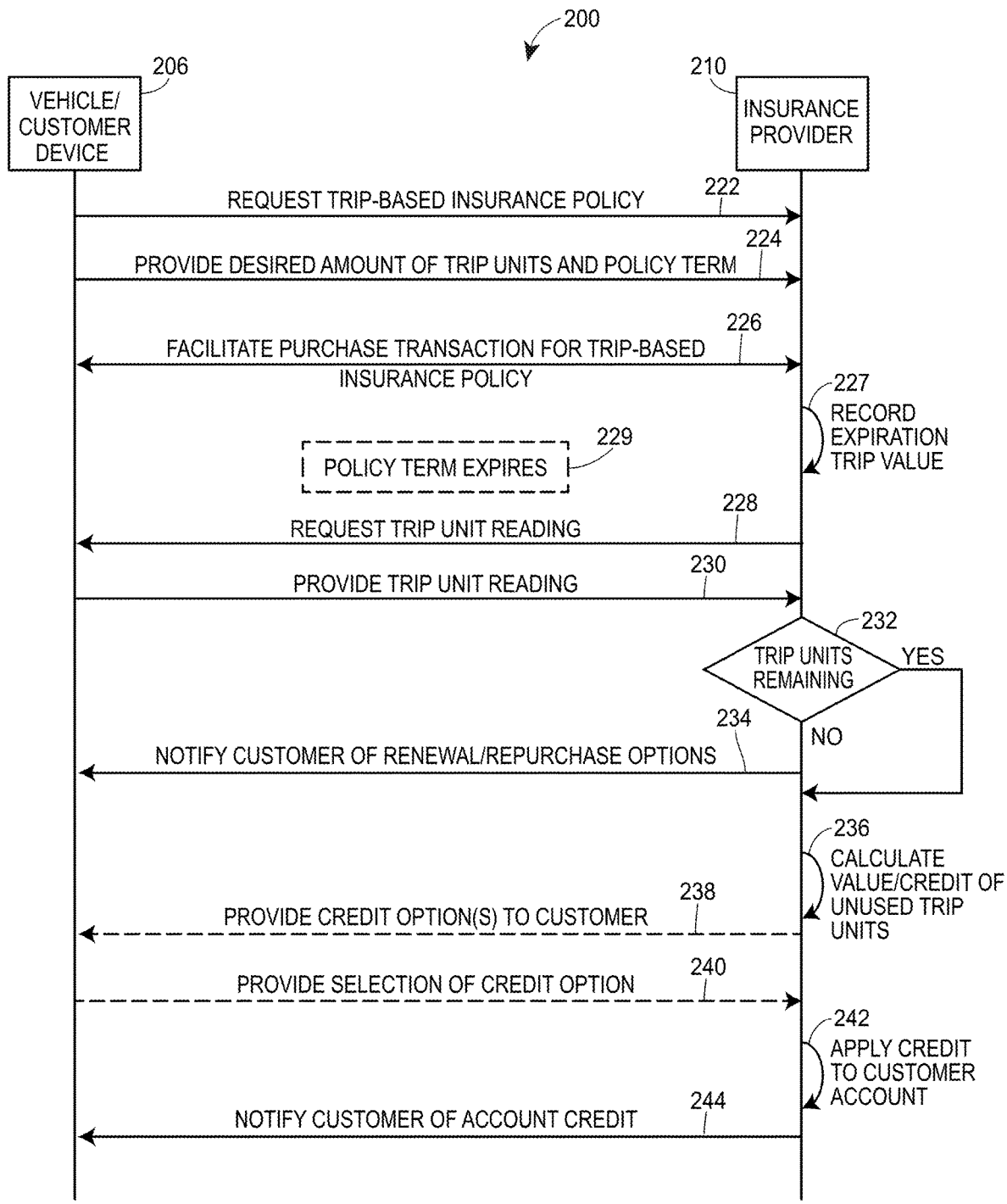
FIG. 2 depicts an example diagram associated with processing credits associated with trip-based vehicle insurance policies in accordance with some embodiments.

Referring to FIG. 2, illustrated is a signal diagram 200 associated with processing credits associated with trip-based insurance policies. In particular, FIG. 2 includes a vehicle/customer device 206 (such as the electronic device 106 as described with respect to FIG. 1) and an insurance provider 210 (such as the insurance provider 110 as described with respect to FIG. 1). It should be appreciated that the vehicle/customer device 206 may include any electronic device associated with the vehicle (e.g., an on-board dash system) and/or any electronic device associated with a user/driver/operator of the vehicle (e.g., a vehicle operator's smartphone, laptop, etc.). Although only one vehicle/customer device 206 is depicted in FIG. 2, it should be appreciated that the insurance provider 210 may communicate with multiple vehicle/customer devices 206 to process credits associated with trip-based insurance policies.

The signal diagram 200 may begin when a customer (i.e., vehicle operator) uses the vehicle/customer device 206 to send a request (222) to the insurance provider 210 for a trip-based insurance policy. Generally, the trip-based insurance policy provides insurance coverage for the vehicle and the vehicle operator for a set amount of trip units. The customer may use the vehicle/customer device 206 to provide (224) a desired amount of trip units and a desired policy term. For example, the customer may request an insurance policy for one hundred (100) trips having a policy term of six (6) months.

The insurance provider 210 may assess an underwriting risk of the customer based on various customer data as well any proposed terms for the trip-based insurance policy, as known in the art, and provide an insurance quote to the vehicle/customer device 206. The insurance quote may offer a trip-based insurance policy with terms that are the same as or different from the originally-requested terms (e.g., fewer or more trip units, shorter or longer policy term, etc.). The vehicle/customer device 206 and the insurance provider 210 may facilitate (226) a purchase transaction for the trip-based insurance policy according to the insurance quote, after which the trip-based insurance policy may be deemed active. The active insurance policy may have an initial trip counter of zero. The insurance provider 210 can record (227) an expiration trip value that is based on the amount of trip-based units purchased. For example, if the customer purchases fifty (50) trips, the expiration trip value is fifty (50) trip units. It should be appreciated that the customer may facilitate the purchase transaction and the terms of the trip-based insurance policy via other techniques or channels, such as via a phone call with the insurance provider 210 or via meeting with an agent of the insurance provider 210.

At a specified time or date, the policy term of the insurance policy expires, as indicated by 229 in FIG. 2. Upon expiration of the policy term, the insurance provider 210 can request (228) the vehicle/customer device 206 for a current trip unit reading, whereby the trip unit reading represents the up-to-date amount of trip units used by the vehicle at or near the expiration time/date of the policy term. The vehicle/customer device 206 may determine or identify the trip unit reading by retrieving data from relevant sensors (e.g., ignition sensor, odometer, etc.), or from memory or storage that maintains the trip unit reading. The vehicle/customer device 206 can provide (230) the trip unit reading to the insurance provider 210, for example via one or more manual or automatic techniques as discussed herein. Based on the trip unit reading, the insurance provider 210 can determine (232) if any unused trip units remain. For example, if the customer initially purchases one hundred (100) trip units and the trip unit reading received from the vehicle/customer device 206 indicates seventy-five (75) used trip units, then there is a total of twenty-five (25) unused trip units. If the insurance provider 210 determines that there are no trip units remaining ("NO"), the insurance provider 210 can notify (234) the customer of any renewal or repurchase options, and the customer may optionally complete an additional purchase transaction for a subsequent or additional insurance policy.

If the insurance provider 210 determines that there are remaining unused trip units ("YES"), the insurance provider 210 can calculate (236) a value or credit associated with the unused trip units. In some embodiments, the insurance provider 210 may designate any unused trip units as "rollover" trip units (e.g., on a 1-1 basis, 2-1 basis, or other bases) that may be applied towards an additional or subsequent trip-based insurance policy. In other embodiments, the insurance provider 210 may convert any unused trip units into one or more discounts that may be applied to an additional or subsequent insurance policy, or to other products or services. For example, if a policy term ends with fifty (50) unused trip units, then the insurance provider may determine that the fifty (50) unused trip units are worth a 20% off discount on a subsequent trip-based insurance policy. In further embodiments, the insurance provider 210 may convert any unused trip units into credits associated with insurance provider 210 (i.e., a value accepted as monetary payment by the insurance provider 210) that may be applied to an additional or subsequent insurance policy.

In still further embodiments, the insurance provider 210 may convert any unused trip units into cash or a cash equivalent. In particular, each unused trip unit may have a set or variable cash value, which may be commensurate with the policy rate for the trip-based insurance policy. In some cases, the cash or cash equivalent may be in the form of an investment asset that may be applied to an insurance policy renewal and that may accrue value over time. Accordingly, the customer is able to build equity in the trip-based insurance policy, similar to how cash values accrue in some life insurance policies. In embodiments, the value of this type of investment asset may be more than a calculated cash value for the same amount of unused trip units, in an effort to incentivize the customer to purchase insurance renewals.

In some embodiments, the insurance provider 210 may offer (238) one or more credit options to the customer, for the customer to select a desired type of credit. For example, the insurance provider may offer the customer a cash value, rollover trip units, or a discount, or a combination thereof. The customer may use the vehicle/customer device 206 to select a credit option and provide (240) the selection to the insurance provider 210. The insurance provider 210 can apply (246) the determined or selected type of credit to an account of the customer. For example, the insurance provider 210 can apply rollover trip units to a customer account. For further example, the insurance provider 210 can deposit money into an account of the customer (or physically mail a check to the customer). The insurance provider 210 can also notify (244) the customer of the account credit.

Figure 3:
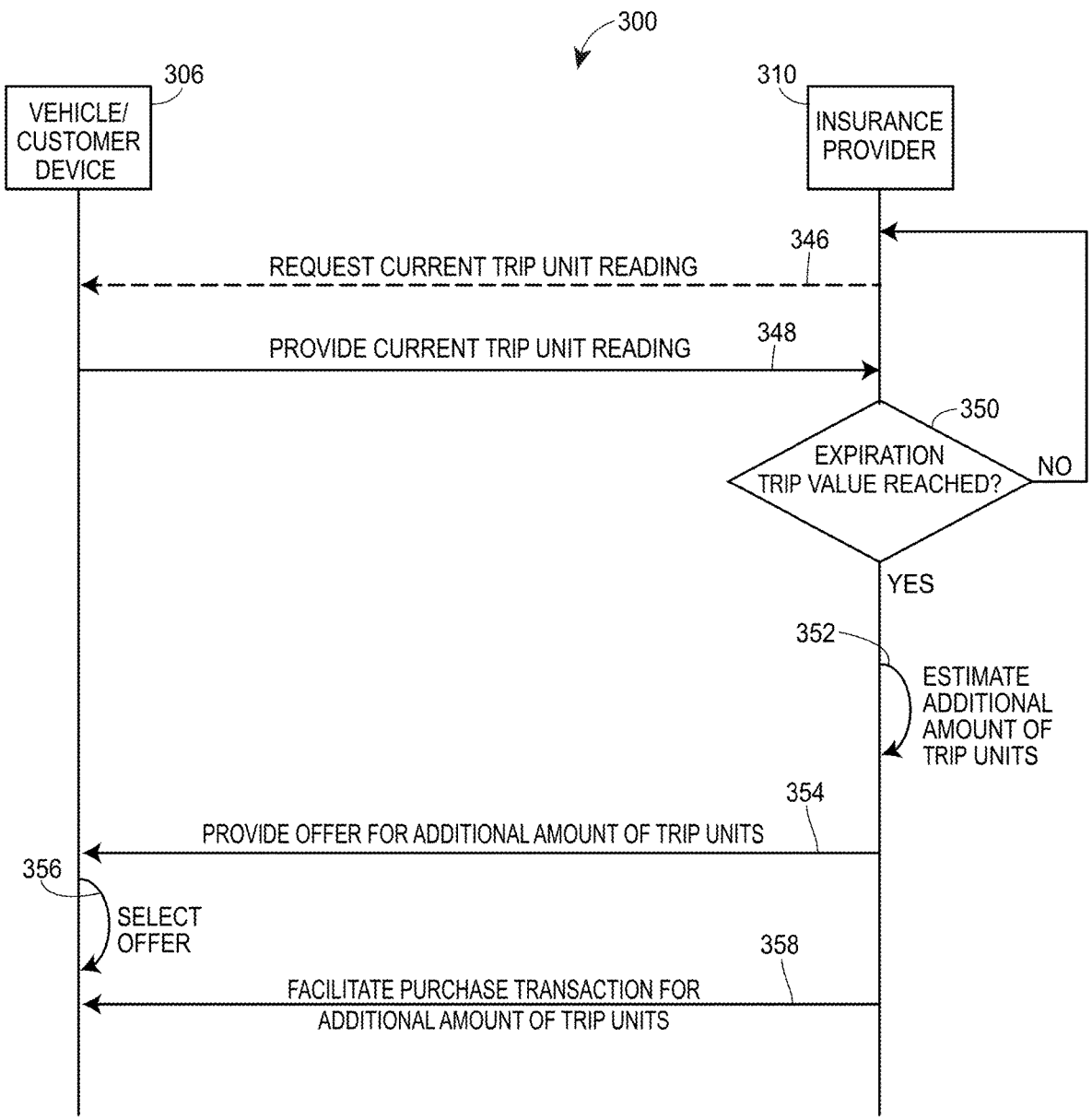
FIG. 3 depicts an example diagram associated with facilitating the purchase of additional trip units for existing trip-based vehicle insurance policies in accordance with some embodiments.

Referring to FIG. 3, illustrated is an additional signal diagram 300 associated with managing trip units associated with trip-based insurance policies. In particular, FIG. 3 includes a vehicle/customer device 306 (such as the electronic device 106 as described with respect to FIG. 1) and an insurance provider 310 (such as the insurance provider 110 as described with respect to FIG. 1). It should be appreciated that the vehicle/customer device 306 may include any electronic device associated with the vehicle (e.g., an on-board dash system) and/or any electronic device associated with a user/driver/operator of the vehicle (e.g., a vehicle operator's smartphone, laptop, etc.). Although only one vehicle/customer device 306 is depicted in FIG. 3, it should be appreciated that the insurance provider 310 may communicate with multiple vehicle/customer devices 306 to manage trip units associated with trip-based insurance policies.

For purposes of explanation, it may be assumed that the signal diagram 300 may begin after a customer (i.e., vehicle operator) has purchased a trip-based insurance policy (such as described with respect to 222, 224, and 226 of FIG. 2), and the insurance provider 310 (as well as the vehicle/customer device 306) has recorded an expiration trip value (such as described with respect to 227 of FIG. 2).

The insurance provider 310 and/or the vehicle/customer device 306 can monitor the remaining amount of trip units throughout the policy term and before the policy term expires, according to various techniques. In one embodiment, the insurance provider 310 can optionally request (346) the vehicle/customer device 306 for a current trip unit reading. The vehicle/customer device 306 can provide (348) the current trip unit reading to the insurance provider 310, for example via one or more manual or automatic techniques as discussed herein. Based on the expiration trip value and the current trip unit reading, the insurance provider 310 can determine (350) whether the expiration trip value has been reached (i.e., whether the amount of trip units has been exhausted). For example, if the customer initially purchased twenty-five (25) trip units and the current trip unit reading meets or exceeds twenty-five (25) trip units, then no trip units remain from the insurance policy. In some embodiments, the insurance provider 310 can determine that the expiration trip value is close to being reached. For example, the expiration trip value may be close to being reached if a difference between the current trip unit reading and the expiration trip value is below a threshold amount (e.g., 3 trips). The threshold amount may be based on the original amount of trip units. For example, if the original amount of trip units is one thousand (1,000) trips, then the threshold amount may be 5% of that amount (or 50 trips). If the insurance provider 310 determines that the expiration trip value has not been reached ("NO"), the insurance provider 310 (and/or the vehicle/customer device 306) can return to monitoring the remaining amount of trip units.

Although not illustrated in FIG. 3, it should be appreciated that the vehicle/customer device 306 can monitor the used trip units during the policy term and detect when the amount of trip units is exhausted. Responsive to the detection, the vehicle/customer device 306 can notify the insurance provider 310 that no trip units remain. Further, although the embodiments herein describe monitoring for trip unit expiration (or determining when the trip units expire), it should be appreciated that certain functionalities may trigger when the trip units are close to running out or expiring. For example, the insurance provider 310 may determine that the customer has one (1) remaining trip unit, and may at that point generate an offer for additional trip units. Therefore, the customer may be given more time to decide whether to purchase additional trip units as well as more time to facilitate the purchase of the additional trip units.

If the insurance provider 310 determines that the expiration trip value has been reached ("YES") (or if the vehicle/customer device 306 detects that no trip units remain), the insurance provider 310 can estimate (352) an additional amount of trip units that the customer may wish to purchase. In some cases, the customer may want to purchase an amount of additional trip units that will last until the end of the policy term but will result in a minimum amount of trip units that remain at the end of the policy term (i.e., an amount of additional trip units that is commensurate with the customer's pace in exhausting the original trip units). Accordingly, the insurance provider 310 can estimate the additional amount of trip units based on the original amount of trip units as well as the time remaining in the policy term. For example, if the customer originally purchased 100 trip units for a six (6)-month policy term and exhausted all of the 100 trip units after three (3) months, then the insurance provider 310 can estimate that the customer may need another 100 trip units to last for the remaining three (3) months of the six (6)-month policy term. It should be appreciated that the vehicle/customer device 306 may similarly estimate the additional amount of trip units using the available data.

The insurance provider 310 can generate an offer for the additional amount of trip units and provide (354) the offer to the vehicle/customer device 306. The offer may be an extension of the original trip-based insurance policy, or may constitute a separate trip-based insurance policy. Further, the offer can include a price or cost of the additional amount of trip units, whereby the price or cost may be based on various factors such as the amount of additional trip units, the trip units remaining in the policy term, and/or other factors. It should be appreciated that the cost of each of the additional amount of trip units may be the same as or different from the cost of each of the original trip units. In embodiments, the additional amount of trip units may expire at the end of the original policy term, however it should be appreciated that the additional amount of trip units may have a different policy term than the original policy term.

The customer may use the vehicle/customer device 306 to select (356) the offer for the additional trip units. In some embodiments, the customer may use the vehicle/customer device 306 to request a different amount of additional trip units (which the insurance provider 310 may or may not approve, or which may or may not result in changes to the quote). The vehicle/customer device 306 and the insurance provider 310 may facilitate (358) a purchase transaction for the additional amount of trip units according to the insurance quote, after which the trip-based insurance policy may once again be deemed active. In some embodiments, the vehicle/customer device 306 can be configured to automatically purchase additional trip units when it is determined that the original amount of trip units have expired. Similarly, the insurance provider 310 may automatically charge the customer for the additional trip units when the insurance provider 310 determines that no original trip units remain.

It should be appreciated that the customer may purchase additional trip units at any point during the policy term of the insurance policy. For example, the customer may envision going on a long road trip that necessitates more trip units than are in a customer account. The customer may therefore explicitly request additional trip units which the insurance provider may offer to the customer for purchase.

FIGS. 4A-4C illustrate example interfaces associated with processing various types of credits associated with trip-based vehicle insurance policies. A vehicle or a customer device (e.g., an on-board dash system, a smartphone, etc.) may be configured to display the interfaces and receive selections and inputs via the interfaces. For example, a dedicated application that is configured to operate on the vehicle or consumer device may display the interfaces. It should be appreciated that the interfaces are merely examples and that alternative or additional content is envisioned. Further, it should be appreciated that alternative devices or machines may display the example interfaces.

FIG. 4A illustrates an interface 460 that notifies a customer of an expiration of a policy term for a trip-based insurance policy. In embodiments, an insurance provider may notify the vehicle/customer device when the policy term lapses, which can cause the vehicle/customer device to display the interface 460. The interface 460 further notifies the customer of any unused trip units that remain from the trip-based insurance policy. In particular, the interface 460 indicates that the customer has two (2) unused trips. The interface 460 also indicates an option for reviewing various credit options for the unused trip units, which the customer may choose to review (or not review) via a "no" selection 461 or a "yes" selection 462.

FIG. 4B illustrates an interface 464 that presents credit options for the unused trip units. According to embodiments, the insurance provider may calculate the credit options based on the amount of unused trip units (as shown: 2 unused trips). As shown in FIG. 4B, the credit options include an option for rollover trips, a 10% discount on a renewal insurance policy, and $25.00 cash. The interface 464 enables the customer to select one of the credit options via radio buttons (as shown: the $25.00 cash option 465). Further, the interface 464 includes a "cancel" selection 466 that enables the customer to exit the credit selection processing and a "submit" selection 467 that enables the customer to submit the selected credit option to the insurance provider.

FIG. 4C illustrates an interface 468 that notifies the customer of the status of the selected credit option. As shown in FIG. 4C, the interface 468 informs the customer that $25.00 has been deposited into his or her bank account. The interface 468 also indicates an option for reviewing options to purchase a renewal insurance policy, which the customer may choose to review (or not review) via a "no thanks" selection 469 or a "yes" selection 470.

Figure 5C:
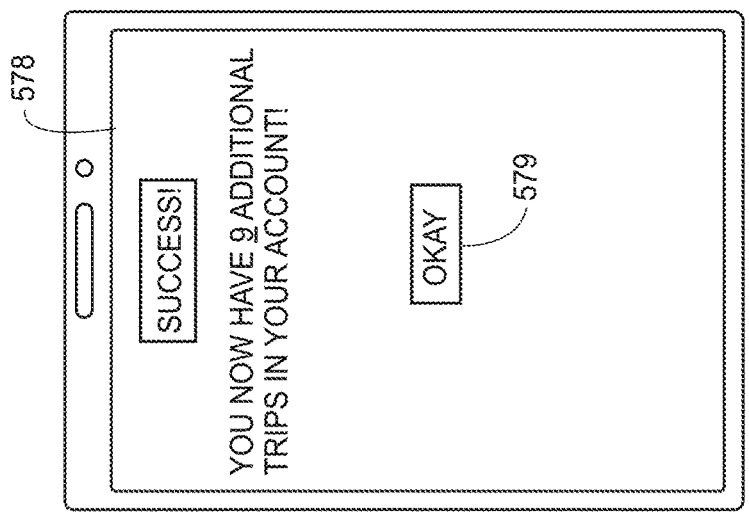
FIGS. 5A-5C depict example interfaces associated with reviewing and selecting additional trip units to purchase in accordance with some embodiments.
Figure 5B:
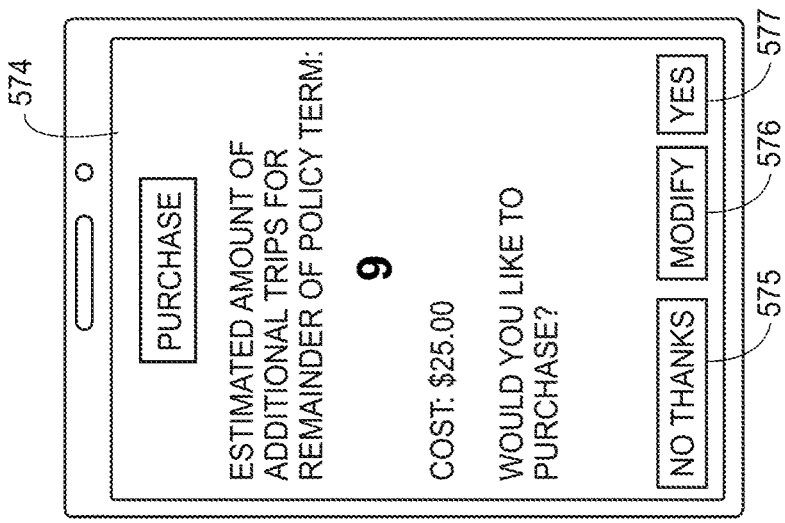
Figure 5A:
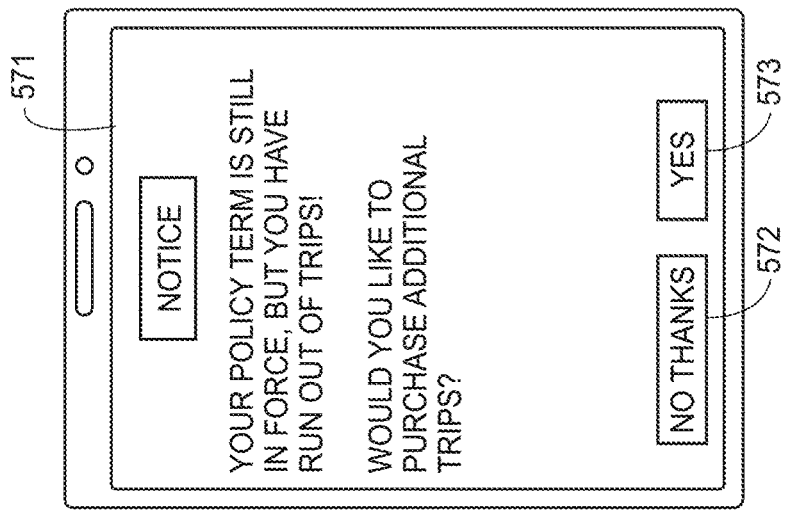

FIGS. 5A-5C illustrate example interfaces associated with purchasing additional trip units for a trip-based vehicle insurance policy. A vehicle or a customer device (e.g., an on-board dash system, a smartphone, etc.) may be configured to display the interfaces and receive selections and inputs via the interfaces. For example, a dedicated application that is configured to operate on the vehicle or consumer device may display the interfaces. It should be appreciated that the interfaces are merely examples and that alternative or additional content is envisioned. Further, it should be appreciated that alternative devices or machines may display the example interfaces.

FIG. 5A illustrates an interface 571 that notifies a customer that all of an original amount of trip units have expired. In embodiments, an insurance provider may notify the vehicle/customer device when the trip units have expired, which can cause the vehicle/customer device to display the interface 571. The interface 571 also indicates an option for the user to purchase additional trip units ("Would you like to purchase additional trips?"). The interface 571 includes a "no thanks" selection 572 that enables the customer to exit the purchasing functionality and a "yes" selection 573 that enables the customer to proceed to purchase additional trip units. Although not illustrated in FIG. 5A, it should be appreciated that the insurance provider may provide a notification to the customer that the original amount of trip units are about to expire (such as if the remaining amount of trip units falls below a certain threshold). In this case, the notification can also enable the customer to purchase additional trip units so as to prevent the amount of trip units from expiring.

FIG. 5B illustrates an interface 574 that the vehicle/customer device may display in response to the user selecting the yes selection 573 of FIG. 5A. The interface 574 indicates an amount of additional trip units available for purchase and that expire at the end of the policy term. In particular, the interface 574 indicates the availability to purchase nine (9) additional trip units for $25.00. The insurance provider may estimate the amount of additional trip units and determine the price for the additional trip units according to the techniques discussed herein. The interface 574 also includes a "no thanks" selection 575 that enables the customer to exit the purchasing functionality and a "yes" selection 577 that enables the customer to proceed to purchase additional trip units. Further, the interface 574 includes a modify selection 576 that enables the customer to modify one or more of the terms of the additional trip units. For example, the customer may request the insurance provider for fewer or more additional trip units (which may or may not result in a change in price for the additional trip units).

FIG. 5C illustrates an interface 578 that the vehicle/customer device may display in response to the user selecting the yes selection 577 of FIG. 5B. Of course, there may be intermediate interfaces that enable the customer to facilitate the purchase transaction for the additional trip units (e.g., an interface to input payment information). The interface 578 indicates that the purchase of the additional trip units has been processed, and that the customer has additional trip units added to his or her account. The interface 578 includes an "okay" selection 579 that enables the customer to dismiss the interface 578.

Figure 6:
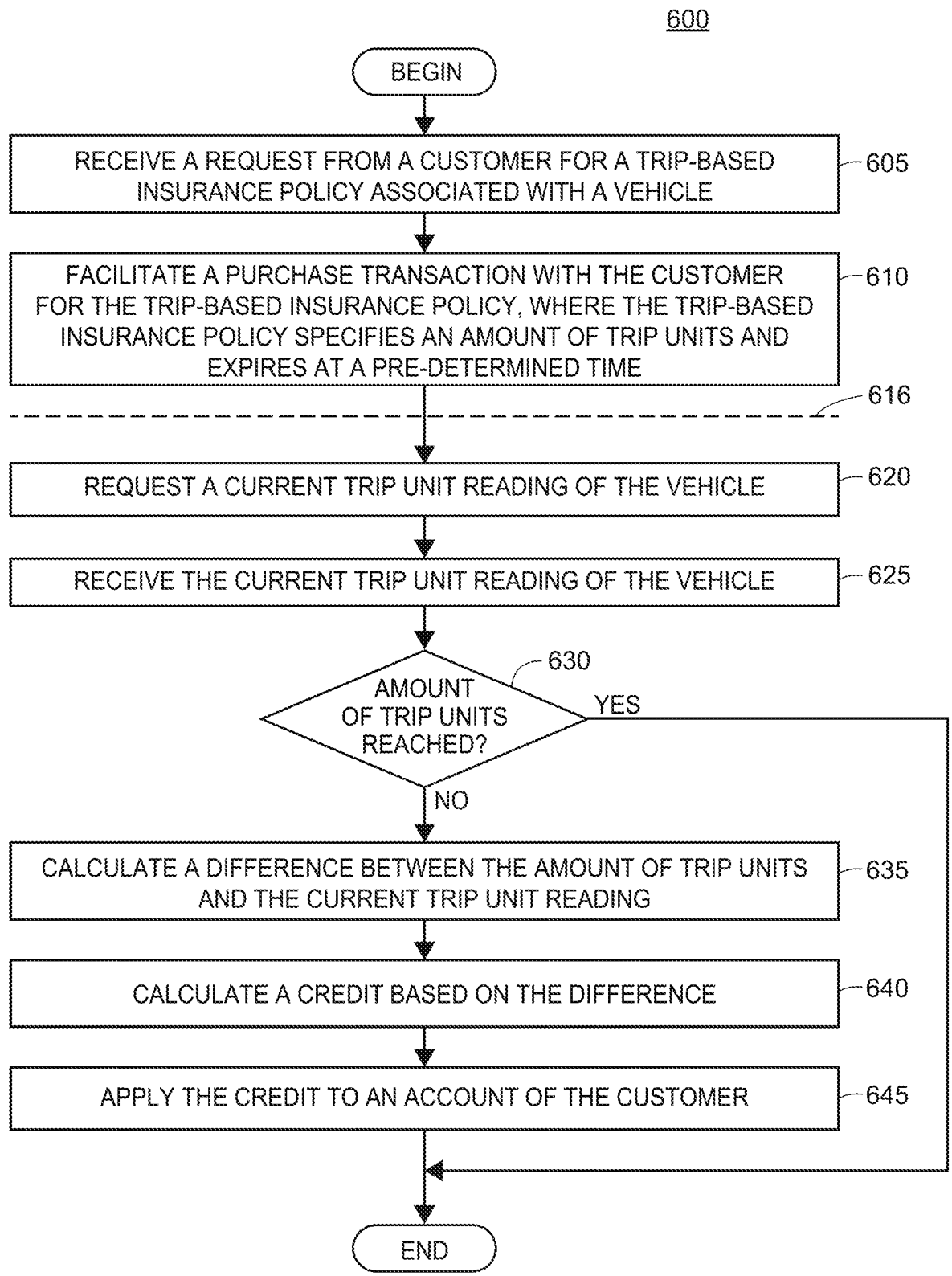
FIG. 6 depicts a flow diagram associated with processing credits associated with trip-based vehicle insurance policies in accordance with some embodiments.

Referring to FIG. 6, depicted is a block diagram of an example method 600 for crediting a customer having a trip-based insurance policy associated with a vehicle. The method 600 may be facilitated between the insurance provider 110 (and specifically the processing server 125) as depicted in FIG. 1 and a customer associated with the vehicle. The customer may access any type of electronic or computing device (such as the electronic device 106) to provide data and make appropriate selections.

The insurance provider can receive (block 605), from the customer, a request for a trip-based insurance policy associated with the vehicle. In some embodiments, the request can include a desired amount of trip units for the trip-based insurance policy. The insurance provider can facilitate (block 610) a purchase transaction with the customer for the trip-based insurance policy, where the trip-based insurance policy expires at a pre-determined time (i.e., has a specified policy term). The trip-based insurance policy also specifies an amount of trip units (which may be the same as or different from the desired amount of trip units).

Line 616 of the method 600 represents an expiration of the pre-determined time (i.e., an expiration of the policy term) for the trip-based insurance policy. In some embodiments, before the pre-determined trip expires, the insurance provider can request a pre-expired trip unit reading and, if the pre-expired trip unit reading indicates that the amount of trip units has been exceeded, the insurance provider can facilitate a purchase transaction for additional trip units (see FIG. 7 and related discussion). At block 620, the insurance provider can request a current trip unit reading of the vehicle after the pre-determined trip expires. According to embodiments, the current trip unit reading can be automatically retrieved or manually inputted by the customer. In either case, the insurance provider can receive (block 625) the current trip unit reading of the vehicle. The insurance provider can determine (block 630) whether the amount of trip units has been reached. In particular, the insurance provider can compare the current trip unit reading with the amount of trip units to determine whether the current trip unit reading meets or exceeds the amount of trip units.

If the insurance provider determines that the amount of trip units has been reached ("YES"), processing can end or proceed to any other functionality. If the insurance provider determines that the amount of trip units has not been reached ("NO"), processing can proceed to block 635 at which the insurance provider can calculate a difference between the amount of trip units and the current trip unit reading, where the difference represents the unused trip units.

The insurance provider can next calculate (block 640) a credit based on the difference. In embodiments, the credit may be in the form of a credit amount of trip units (or "rollover" trip units) according to the difference. In other embodiments, the credit may be in the form of a monetary credit (e.g., cash or cash equivalent). In further embodiments, the credit may be in the form of a monetary accrual amount (e.g., a cash accrual policy), whereby the customer may choose whether to receive the monetary value of the credit or have an account (e.g., an investment account) credited with the monetary accrual amount. Moreover, in embodiments, the credit may be in the form of a discount offer, such as a discount offer for a subsequent or further insurance policy term. The insurance provider can apply (block 645) the credit to an account of the customer. In some cases, for example if the credit is a monetary credit, the insurance provider may deposit the monetary credit into a bank account of the customer (or send a check to the customer). Otherwise, the insurance provider can update the account of the customer according to the type of the credit and the value of the credit.

Figure 7:
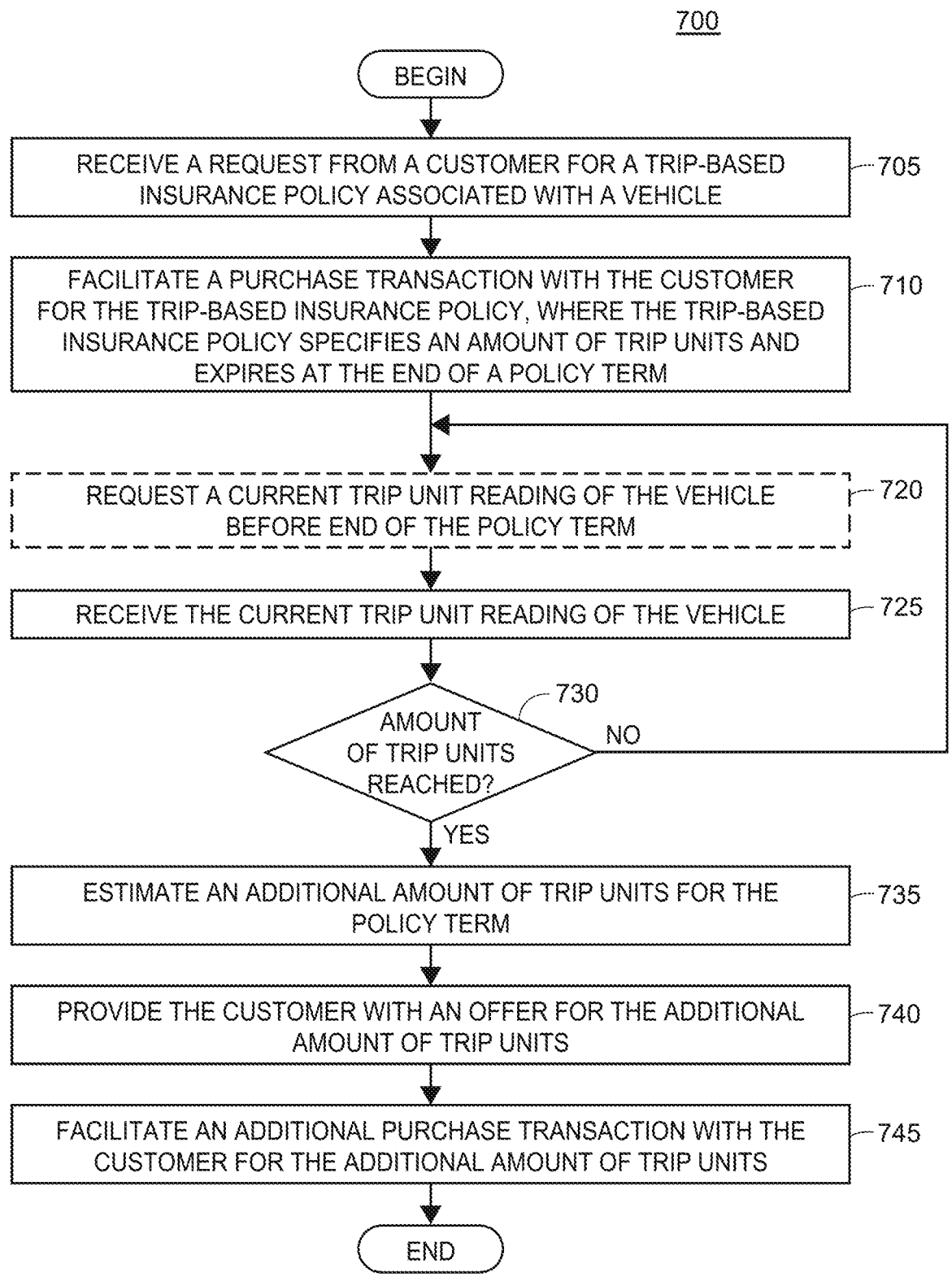
FIG. 7 depicts a flow diagram associated with an insurance provider facilitating the purchase of additional trip units for an existing trip-based vehicle insurance policy in accordance with some embodiments.

Referring to FIG. 7, depicted is a block diagram of an example method 700 for enabling a customer to purchase additional trip units for a trip-based insurance policy associated with a vehicle. The method 700 may be facilitated between the insurance provider 110 (and specifically the processing server 125) as depicted in FIG. 1 and a customer associated with the vehicle. The customer may access any type of electronic or computing device (such as the electronic device 106) to provide data and make appropriate selections.

The insurance provider can receive (block 705), from the customer, a request for a trip-based insurance policy associated with the vehicle. In some embodiments, the request can include a desired amount of trip units for the trip-based insurance policy. The insurance provider can facilitate (block 710) a purchase transaction with the customer for the trip-based insurance policy, where the trip-based insurance policy expires at the end of a policy term (i.e., has a pre-determined expiration time). The trip-based insurance policy also specifies an amount of trip units (which may be the same as or different from the desired amount of trip units).

At block 720, the insurance provider can optionally request a current trip unit reading of the vehicle before the end of the policy term. According to embodiments, the current trip unit reading can be automatically retrieved or manually inputted by the customer. In either case, the insurance provider can receive (block 725) the current trip unit reading of the vehicle. In some embodiments, the customer can automatically provide the current trip unit reading without the insurance provider having to send the request.

The insurance provider can determine (block 730) whether the amount of trip units has been reached. In particular, the insurance provider can compare the current trip unit reading with the amount of trip units to determine whether the current trip unit reading meets or exceeds the amount of trip units. The insurance provider can also determine when the amount of trip units is close to being reached. For example, the difference between the current trip unit reading and the amount of trip units can fall below a threshold amount. In some embodiments, the customer may automatically provide the current trip unit reading when the amount of trip units is reached so that the insurance provider need not perform the determination of block 730.

If the insurance provider determines that the amount of trip units has not been reached ("NO"), processing can return to block 720 or proceed to any other functionality. It should be appreciated that the insurance provider may then periodically request the current trip unit reading from the customer. If the insurance provider determines that the amount of trip units has been reached ("YES"), processing can proceed to block 735 at which the insurance provider can estimate an additional amount of trip units for the policy term. In particular, the insurance provider can estimate the additional amount of trip units based on the current trip unit reading and a time remaining on the policy term.

The insurance provider can provide (block 740) the customer with an offer for the additional amount of trip units. In some embodiments, the additional amount of trip units may have an average cost that is more (or less) than the average cost of the original trip units. Further, the additional amount of trip units may also expire at the end of the policy term, or they may have a different policy term. The customer can accept the offer and the insurance provider can facilitate (block 745) an additional purchase transaction with the customer for the additional amount of trip units. In some cases, the insurance provider may automatically facilitate the additional purchase transaction with the customer in response to the customer reaching the amount of trip units.

Figure 8:
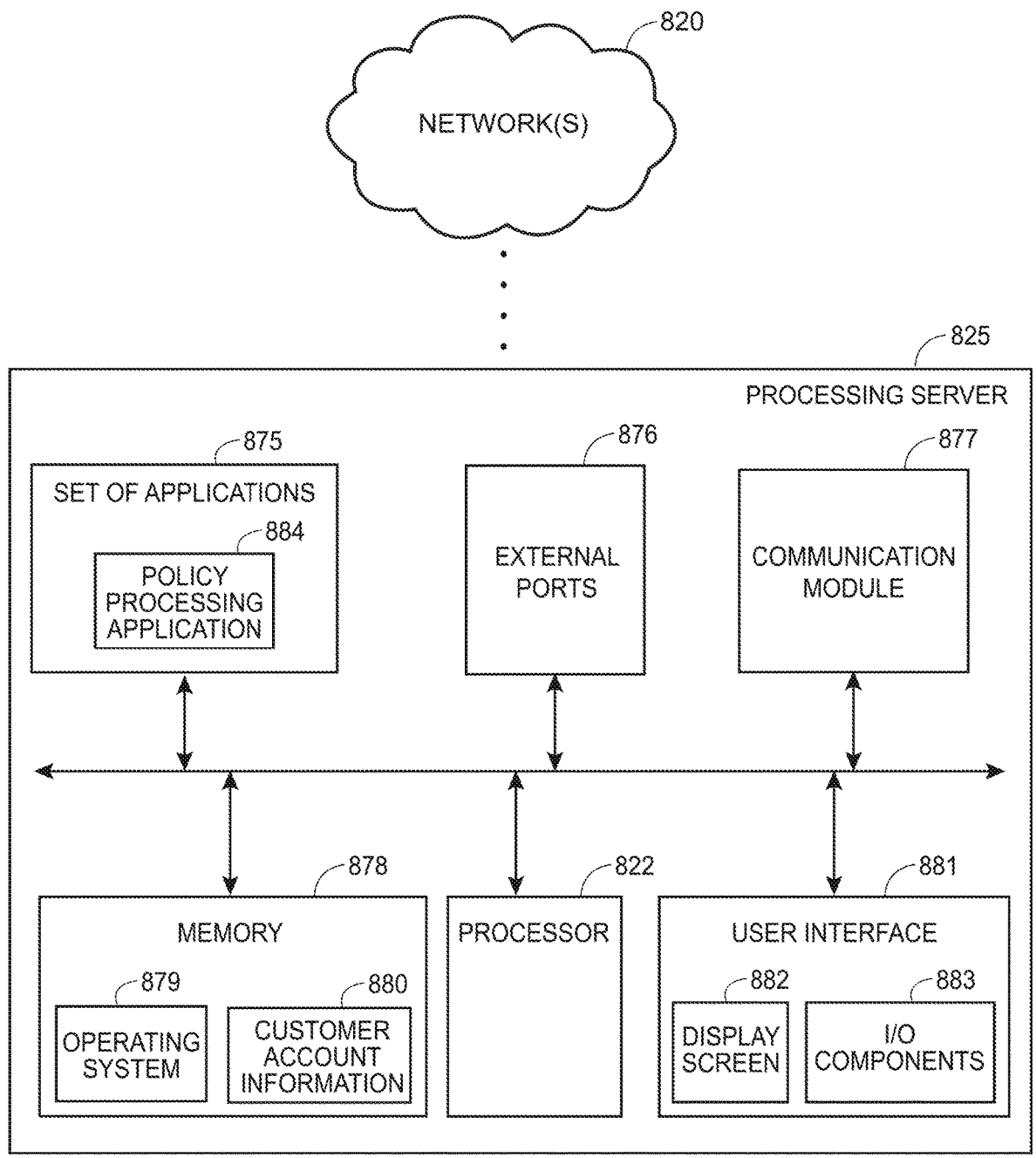
FIG. 8 is a block diagram of a processing server in accordance with some embodiments.

FIG. 8 illustrates a diagram of an example processing server 825 (such as the processing server 125 discussed with respect to FIG. 1) in which the functionalities as discussed herein may be implemented. It should be appreciated that the processing server 825 can be associated with an insurance provider, as discussed herein.

The processing server 825 can include a processor 822 as well as a memory 878. The memory 878 can store an operating system 879 capable of facilitating the functionalities as discussed herein as well as a set of applications 875 (i.e., machine readable instructions). For example, one of the set of applications 875 can be a policy processing application 884 configured to facilitate the offering and purchase of trip-based insurance policies. It should be appreciated that other applications are envisioned.

The processor 822 can interface with the memory 878 to execute the operating system 879 and the set of applications 875. According to embodiments, the memory 878 can also include customer account information 880 that includes information related to accounts of customers, including insurance policies and credits associated therewith. The policy processing application 884 may interface with the customer account information 880 to retrieve relevant information that the policy processing application 884 may use to process insurance policies and terms associated therewith. The memory 878 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The processing server 825 can further include a communication module 877 configured to communicate data via one or more networks 820. According to some embodiments, the communication module 877 can include one or more transceivers (e.g., WWAN, WLAN, and/or WPAN transceivers) functioning in accordance with IEEE standards, 3GPP standards, or other standards, and configured to receive and transmit data via one or more external ports 876. For example, the communication module 877 can send, via the network 820, requests for trip-based information and/or credit options and receive relevant data and selections. The processing server 825 may further include a user interface 881 configured to present information to a user and/or receive inputs from the user. As shown in FIG. 8, the user interface 881 includes a display screen 882 and I/O components 883 (e.g., ports, capacitive or resistive touch sensitive input panels, keys, buttons, lights, LEDs, speakers, microphones). According to embodiments, the user may access the processing server 825 via the user interface 881 to process insurance policies and/or perform other functions. In some embodiments, the processing server 825 can perform the functionalities as discussed herein as part of a "cloud" network or can otherwise communicate with other hardware or software components within the cloud to send, retrieve, or otherwise analyze data.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 822 (e.g., working in connection with the operating system 879) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy (e.g., for variable life or universal life insurance policies), or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to vehicle or automobile insurance policies, it should be appreciated that an insurance provider may offer or provide one or more different types of insurance policies. Other types of insurance policies may include, for example, homeowners insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method in a processing server of crediting customers having a trip-based vehicle insurance policy, wherein the trip-based insurance policy is defined by an amount of trip units, each of the amount of trip units insuring operation of a vehicle from initiation of a trip to completion of the trip, the method comprising:

facilitating, by one or more processors of the processing server, a purchase transaction with a customer for the trip-based insurance policy associated with the vehicle, a coverage provided by the trip-based insurance policy (1) is based on the amount of trip units specified by the trip-based insurance policy, and (2) expires at a pre-determined time, wherein usage of the amount of trip units is detected by a set of sensors including:

an ignition sensor located within the vehicle that detects an initiation and a termination of a given trip, and a system clock located within the vehicle that records a set of timing parameters for the initiation and the termination of the given trip;

before the pre-determined time expires:

retrieving, by the one or more processors of the processing server via a wireless network connection from a memory device associated with the vehicle, a pre-expired trip unit reading of the vehicle, wherein the memory device (i) maintains the pre-expired trip unit reading based on sensor data retrieved from the set of sensors including at least the ignition sensor and the system clock located within the vehicle, and (ii) automatically provides the pre-expired trip unit reading to the processing server via the wireless network connection, and wherein the processing server is remote from the memory device, determining, by the one or more processors, that a difference between the pre-expired trip unit reading and the amount of trip units is below a threshold value, the threshold value being a set percentage of the amount of trip units, and in response to determining that the difference is below the threshold value, facilitating, by the one or more processors, an additional purchase transaction with the customer for an additional amount of trip units.

2. The computer-implemented method of claim 1, further comprising, responsive to the pre-determined time expiring:

automatically retrieving, via the wireless network connection from the memory device, a current trip unit reading of the vehicle, the current trip unit reading representing an up-to-date amount of trip units, of the amount of trip units specified by the trip-based insurance policy and the additional amount of trip units, used by the vehicle at a time when the pre-determined time expires, wherein the memory device maintains the current trip unit reading based on the sensor data retrieved from the set of sensors located within the vehicle.

3. The computer-implemented method of claim 2, further comprising, responsive to the pre-determined time expiring:

calculating, by the one or more processors, a difference between (i) a sum of the amount of trip units and the additional amount of trip units, and (ii) the current trip unit reading, the current trip unit reading being less than the sum of the amount of trip units and the additional amount of trip units.

4. The computer-implemented method of claim 3, further comprising, responsive to the pre-determined time expiring:

determining a credit based on the difference between (i) the sum of the amount of trip units and the additional amount of trip units, and (ii) the current trip unit reading.

5. The computer-implemented method of claim 4, further comprising, responsive to the pre-determined time expiring:

applying, by the one or more processors, the credit to an account of the customer to be used by the customer for a subsequent transaction.

6. The computer-implemented method of claim 5, wherein applying the credit to the account of the customer comprises:

crediting the account of the customer with a credit of trip units according to the difference.

7. The computer-implemented method of claim 5, wherein applying the credit to the account of the customer comprises:

calculating a monetary credit based on the difference; and applying the monetary credit to the account of the customer.

8. A system for processing a trip-based vehicle insurance policy, wherein the trip-based insurance policy is defined by an amount of trip units, each of the amount of trip units insuring operation of a vehicle from initiation of a trip to completion of the trip, comprising:

a communication module configured to communicate data via a wireless network connection;

a memory storing non-transitory computer executable instructions; and a processor interfacing with the communication module and the memory, wherein the processor is configured to execute the non-transitory computer executable instructions to cause the processor to:

facilitate a purchase transaction with a customer for the trip-based insurance policy associated with the vehicle, a coverage provided by the trip-based insurance policy (1) is based on the amount of trip units specified by the trip-based insurance policy, and (2) expires at a pre-determined time, wherein usage of the amount of trip units is detected by a set of sensors including:

an ignition sensor located within the vehicle that detects an initiation and a termination of a given trip, and a system clock located within the vehicle that records a set of timing parameters for the initiation and the termination of the given trip, before the pre-determined time expires:

retrieve, via a wireless network connection from a memory device associated with the vehicle, a pre-expired trip unit reading of the vehicle, wherein the memory device (i) maintains the pre-expired trip unit reading based on sensor data retrieved from the set of sensors including at least the ignition sensor and the system clock located within the vehicle, and (ii) automatically provides the pre-expired trip unit reading to the processing server via the wireless network connection, and wherein the processor is remote from the memory device, determine that a difference between the pre-expired trip unit reading and the amount of trip units is below a threshold value, and in response to determining that the difference is below the threshold value, facilitate an additional purchase transaction with the customer for an additional amount of trip units.

9. The system of claim 8, wherein the processor is further configured to:

responsive to the pre-determined time expiring, automatically retrieve, via the communication module from the memory device, a current trip unit reading of the vehicle, the current trip unit reading representing an up-to-date amount of trip units, of the amount of trip units specified by the trip-based insurance policy and the additional amount of trip units, used by the vehicle at a time when the pre-determined time expires, wherein the memory device maintains the current trip unit reading based on the sensor data retrieved from the set of sensors located within the vehicle.

10. The system of claim 9, wherein the processor is further configured to:

calculate a difference between (i) a sum of the amount of trip units and the additional amount of trip units, and (ii) the current trip unit reading, the current trip unit reading being less than the sum of the amount of trip units and the additional amount of trip units.

11. The system of claim 10, wherein the processor is further configured to:

determine a credit based on the difference between (i) the sum of the amount of trip units and the additional amount of trip units, and (ii) the current trip unit reading.

12. The system of claim 11, wherein the processor is further configured to:
apply the credit to an account of the customer to be used by the customer for a subsequent transaction.

13. The system of claim 12, wherein to apply the credit to the account of the customer, the processor is configured to:
credit the account of the customer with a credit of trip units according to the difference.

14. The system of claim 12, wherein to apply the credit to the account of the customer, the processor is configured to:
calculate a monetary credit based on the difference, and apply the monetary credit to the account of the customer.

15. A non-transitory computer-readable storage medium having stored thereon a set of instructions, executable by a processor of a processing server, for processing a trip-based vehicle insurance policy, wherein the trip-based insurance policy is defined by an amount of trip units, each of the amount of trip units insuring operation of a vehicle from initiation of a trip to completion of the trip, the instructions comprising:
instructions for facilitating, by the processor, a purchase transaction with a customer for the trip-based insurance policy associated with the vehicle, a coverage provided by the trip-based insurance policy (1) is based on the amount of trip units specified by the trip-based insurance policy, and (2) expires at a pre-determined time, wherein usage of the amount of trip units is detected by a set of sensors including:
an ignition sensor located within the vehicle that detects an initiation and a termination of a given trip, and
a system clock located within the vehicle that records a set of timing parameters for the initiation and the termination of the given trip;
instructions for, before the pre-determined time expires, retrieving, via a wireless network connection from a memory device associated with the vehicle, a pre-expired trip unit reading of the vehicle, wherein the memory device (i) maintains the pre-expired trip unit reading based on sensor data retrieved from the set of sensors including at least the ignition sensor and the system clock located within the vehicle, and (ii) automatically provides the pre-expired trip unit reading to the processing server via the wireless network connection, and wherein the processing server is remote from the memory device;
instructions for, before the pre-determined time expires, determining, by the processor, that a difference between the pre-expired trip unit reading and the amount of trip units is below a threshold value, the threshold value being a set percentage of the amount of trip units; and
instructions for, before the pre-determined time expires, in response to determining that the difference is below the threshold value, facilitating, by the processor, an additional purchase transaction with the customer for an additional amount of trip units.

16. The non-transitory computer-readable storage medium of claim 15, wherein the instructions further comprise, responsive to the pre-determined time expiring:
instructions for automatically retrieving, via the wireless network connection from the memory device, a current trip unit reading of the vehicle, the current trip unit reading representing an up-to-date amount of trip units, of the amount of trip units specified by the trip-based insurance policy and the additional amount of trip units, used by the vehicle at a time when the pre-determined time expires, wherein the memory device maintains the current trip unit reading based on the sensor data retrieved from the set of sensors located within the vehicle.

17. The non-transitory computer-readable storage medium of claim 16, wherein the instructions further comprise, responsive to the pre-determined time expiring:
instructions for calculating, by the processor, a difference between (i) a sum of the amount of trip units and the additional amount of trip units, and (ii) the current trip unit reading, the current trip unit reading being less than the sum of the amount of trip units and the additional amount of trip units.

18. The non-transitory computer-readable storage medium of claim 16, wherein the instructions further comprise, responsive to the pre-determined time expiring:
instructions for determining a credit based on the difference between (i) the sum of the amount of trip units and the additional amount of trip units, and (ii) the current trip unit reading.

19. The non-transitory computer-readable storage medium of claim 18, wherein the instructions further comprise, responsive to the pre-determined time expiring:
instructions for applying, by the processor, the credit to an account of the customer to be used by the customer for a subsequent transaction.

20. The non-transitory computer-readable storage medium of claim 19, wherein the instructions for applying the credit to the account of the customer comprise:
instructions for crediting the account of the customer with a credit of trip units according to the difference.

* * * * *